United States Patent
Pescher et al.

(10) Patent No.: US 6,855,268 B1
(45) Date of Patent: Feb. 15, 2005

(54) COMPOSITION USEFUL FOR CONDITIONING SLUDGE DERIVED FROM THE TREATMENT OF AN AQUEOUS MEDIUM AND USES THEREOF

(75) Inventors: Yvette Pescher, Bagneux (FR); Bruno Bavouzet, Paris (FR); Michèle Raffard, Paris (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 16 days.

(21) Appl. No.: 10/088,234
(22) PCT Filed: Sep. 20, 2000
(86) PCT No.: PCT/FR00/02610
§ 371 (c)(1),
(2), (4) Date: Jun. 7, 2002
(87) PCT Pub. No.: WO01/21532
PCT Pub. Date: Mar. 29, 2001

(30) Foreign Application Priority Data
Sep. 20, 1999 (FR) .............................. 99 11747

(51) Int. Cl.[7] ................................. C02F 5/10
(52) U.S. Cl. ................. 252/180; 252/181; 210/609
(58) Field of Search ................................. 252/180, 181; 210/609

(56) References Cited

U.S. PATENT DOCUMENTS

| | | | | |
|---|---|---|---|---|
| 4,606,913 A | * | 8/1986 | Aronson et al. | 424/59 |
| 4,617,362 A | * | 10/1986 | Becker et al. | 526/209 |
| 5,200,086 A | * | 4/1993 | Shah et al. | 210/708 |
| 5,763,530 A | * | 6/1998 | Chen et al. | 524/521 |
| 5,830,388 A | * | 11/1998 | Kigel et al. | 516/113 |
| 5,906,750 A | * | 5/1999 | Haase | 210/727 |
| 6,090,886 A | * | 7/2000 | Konno et al. | 524/839 |
| 6,120,690 A | * | 9/2000 | Haase | 210/728 |
| 6,168,686 B1 | * | 1/2001 | Sutman et al. | 162/142 |

* cited by examiner

Primary Examiner—Chester T Barry
(74) Attorney, Agent, or Firm—Burns, Doane, Swecker & Mathis, L.L.P.

(57) ABSTRACT

The invention concerns a composition useful for conditioning sludge obtained by mixing an invert emulsions containing at least a cationic polyelectrolyte with an invert emulsion or an aqueous solution containing at least a mineral cation with a charge not less than two. The invention also concerns the corresponding applications.

29 Claims, 5 Drawing Sheets

COMPOSITION USEFUL FOR CONDITIONING SLUDGE DERIVED FROM THE TREATMENT OF AN AQUEOUS MEDIUM AND USES THEREOF

The present invention concerns a novel composition which can be used in particular for treating aqueous media such as waste or urban or industrial water and more particularly conditioning sludge prior to the operation for dehydration thereof.

The treatment of waste, urban or industrial water, in particular by a biological method, in purification stations, results in the production of sludges. Those sludges are generally subjected to a mechanical dehydration operation (in particular filtration or centrifuging) before being transported to a discharge site, an agricultural spreading site or an incineration site.

The sludges to be treated are formed for the major proportion thereof by water in which the biomass is dispersed in a proportion of between 12 and 40 g/l. The treatments therefore aim at providing for maximum concentration of the dry matter and eliminating the water.

The object of the present invention is precisely to propose a novel composition which can be effectively used in conditioning this type of sludge, making it possible in particular to increase its dryness, that is to say to increase the dry extracts obtained in the subsequent dehydration operation.

When the sludge is intended for a filter press, an inorganic salt associated if appropriate with an electrolyte, generally lime, is conventionally added to the sludge to be treated.

On the other hand when the sludge is intended to be treated on a belt filter or by means of a centrifuge, the drainability necessary for removal of the water is generally achieved by sequentially adding thereto an inorganic salt, a cationic polymer and then optionally an anionic polymer.

The methods of treating sludges which are available at the present time are therefore different, according to the water/biomass separation procedure adopted. On the other hand, they generally necessitate the successive addition of a plurality of reactants. It is in fact found to be difficult to formulate in a single composition and at significant levels of concentration, an organic salt of polyaluminum chloride type and a cationic polyelectrolyte. Aluminum being a sequestering agent in respect of certain polyelectrolytes, the mixtures thereof result, from a certain level of concentration in respect of such compounds, in the formation of gels which as will be appreciated are prejudicial in terms of fluidity to the corresponding mixtures.

The object of the present invention is precisely to propose a universal composition, that is to say which can be used equally for treating sludges according to either one of the above-discussed procedures.

Moreover the claimed composition affords the advantage of combining in the form of a mixture, a mineral cation of a charge of higher than or equal to 2 and a cationic polyelectrolyte, while not being subject to the above-discussed gelling phenomenon.

More precisely, the main object of the present invention is a composition which is useful for conditioning sludge obtained by mixing at least one invert emulsion containing at least one cationic polyelectrolyte with an invert emulsion or an aqueous solution containing at least one mineral cation with a charge of higher than or equal to two.

The invention also extends to a composition which is useful for conditioning sludge characterised in that it is in the form of an emulsion comprising in an aqueous phase or phases and separately at least one mineral cation with a charge of greater than or equal to 2 and a cationic polyelectrolyte.

In accordance with a first embodiment the composition is in the form of an invert water-in-oil emulsion in which the mineral cation and the cationic polyelectrolyte are distributed in water droplets which are distinct in the oily phase.

This type of composition is generally obtained by mixing with agitation an invert emulsion containing the mineral cation with an invert emulsion containing the cationic polyelectrolyte.

In accordance with a second embodiment the composition is in the form of a double water/oil/water emulsion in which the mineral cation is present at the level of the continuous aqueous phase and the cationic polyelectrolyte is distributed at least in part in water droplets constituting the second aqueous phase dispersed in the oily phase.

This second type of emulsion can be obtained by mixing an invert emulsion of the cationic polyelectrolyte with an aqueous solution of the mineral cation.

The compositions claimed are particularly advantageous insofar as they are found to be effective for all of the procedures for treating sludges, namely belt filtration and/or centrifuging or filtration on a press.

Moreover, by permitting isolation of the mineral cation from the cationic polyelectrolyte, they make it possible to formulate those reactants in higher concentrations. By virtue of that formulation in emulsion, the risk of gelling is significantly reduced.

The composition obtained by mixing the two invert emulsions, namely that of the mineral cation and that of the cationic polyelectrolyte, is more particularly suited to the Formulation of a concentrated composition. In fact, those two compounds are then distributed at the level of the emulsion in separate water droplets and are therefore effectively isolated from each other.

The mineral cation has a charge of greater than or equal to 2. It is usually selected from $Mg^{2+}$, $Al^{3+}$, $Fe^{3+}$, $La^{3+}$, $Zr^{4+}$ and their polymerised forms when they exist. Very preferably, the cation is $Al^{3+}$ or one of its polymerised forms.

That mineral cation is present in the form of a water-soluble salt. As soluble salts, it is possible to use chlorides, nitrates, sulfates and acetates.

In general, the procedure involves using a soluble salt which is free from the element nitrogen, which makes it possible to avoid possible problems linked to the presence thereof. Very preferably, a chloride is used. The cation is preferably an aluminum chloride or one of its polymerised forms and more preferably polyaluminum chloride.

The amount of mineral cation used is preferably between 0.05 and 2 moles, in particular between 0.49 and 1.8 moles per kg of the composition.

The pH-value of the solution or emulsion is adjusted in such a way as to prevent precipitation of the mineral salt in the continuous aqueous phase. That adjustment is a matter for the capability of the man skilled in the art.

As regards the cationic polyelectrolyte it is preferably of high molecular weight, that is to say of a molecular weight of greater than $1.10^6$.

The polyelectrolytes are preferably of a molecular weight of between $1.10^6$ and about $20.10^6$, more preferably between $1.10^6$ and about $10.10^6$.

The cationic polyelectrolyte can be branched or straight-chain and is preferably in branched form. It has in fact been noted that the branchings have a beneficial effect on the coagulation and flocculation kinetics.

Particularly suitable cationic polyelectrolytes are polyacrylamides, oxides of polyethylenes and polyvinylpyrrolidones, as well as polymers of natural origin such as starch and derivatives thereof or gum such as gum guar, insofar as they are cationic.

Preferably the polyelectrolyte is a polyacrylamide.

The polyacrylamide can be cationic up to 100% in respect of charge and is preferably cationic at between about 0.1 and 15% in respect of charge.

The cationic polyacrylamides comprise copolymers of polyacrylamide with cationic monomers or polyacrylamides modified in accordance with the Mannich reaction.

The examples of cationic polyacrylamide copolymers include the copolymers acrylamide/halide and preferably chloride of diallyidialkylammonium, the copolymers diaminoalkylmethacrylate/acrylamide and the copolymers dialkylaminoalkylmethacrylates/acrylamides, the alkyl group being $C_1$ to $C_6$.

Advantageously the cationic polyelectrolyte is a polyacrylamide copolymer and preferably the copolymer polyacrylamide/diallyldimethylammonium chloride of a molecular weight of the order of $3.10^6$. It is more preferably associated with an polyaluminum chloride in the composition claimed.

The amount of cationic polyelectrolyte present in the composition claimed is preferably at most 10% by weight, in particular between 0.3% and 8% by weight of said composition.

Generally the invert emulsion of the cationic polyelectrolyte, for example in the case of a polyacrylamide of high molecular weight and the aqueous solution or the invert emulsion of the mineral cation, for example in the case of the polyaluminum chloride, are used in such a way that the molar ratio (mineral cation with a charge of greater than or equal to 2)/(cationic polyelectrolyte) is between $1.10^2$ and $8.10^6$ and in particular between $1.10^3$ and $8.10^6$. In the particular case of a composition comprising polyaluminum chloride and a copolymer acrylamide/diallyldialkylammonium chloride of high molecular weight, the weight ratio of polyaluminum chloride/polyacylamide used is preferably between 0.1 and 15 and more particularly between 0.1 and 10.

As indicated hereinbefore the compositions claimed containing the mineral cation and the cationic polyelectrolyte which are distributed in separate water droplets in the continuous oily phase are particularly attractive in terms of formulating a composition which is concentrated in respect of those two compounds. It is thus that this mode of formulation will be afforded the preference for compositions containing a concentration of polyacrylamide of the order of between 4 and 10% by weight with respect to the composition.

If necessary the composition claimed can be stabilised in the form of an emulsion by means of a surface active agent or agents. The surface active agents are generally introduced at the level of the invert emulsion or emulsions constituting the composition.

As regards the surface active agent which is present in the oily phase of the emulsion, this is preferably a surface agent which as will be appreciated remains inert in relation to the mineral cation.

The liposoluble surface active agents which can be used in the emulsion according to the invention can be selected from liposoluble lecithins, esters of sorbitan and fatty acids, polyalkylene dipolyhydroxystearates, fatty acids, monoglycerides, polyglycerol esters and esters of lactic and tartric acids.

By way of illustration of the water-soluble surface active agents, mention may be made in particular of water-soluble lecithins, sucrose esters, fatty acid esters (including Tweens®), polyoxyethylenated alkylamides, triglyceride sulfates, alkyl sulfates (including sodium dodecyl sulfate SDS), alkyl ether sulfates, alkyl sulfonates, alkylamine salts, fatty amines, lipoamino acids, modified polyesters and silicone-bearing polymeric surface active agents.

The amounts of surface active agents are adjusted in such a way as to stabilise the formulation (invert or double emulsion) of the composition.

The composition claimed can be prepared either by mixing the two invert emulsions respectively containing the mineral cation and the polyelectrolyte, or by adding the invert emulsion containing the polyelectrolyte to an aqueous solution of the polyelectrolyte. The mixtures are generally produced at ambient temperature and with adequate mechanical agitation to result in an emulsion which is stabilised in respect of time.

By way of illustration of the compounds which are suitable for use as the oily phase in accordance with the invention, mention may be more particularly made of hydrophobic materials such as in particular rosin esters, lanolin, vaseline, waxes, polybutadienes of low molecular masses, animal, vegetable or mineral natural oils and mixtures thereof.

The compositions claimed are used in a particularly attractive manner in the chemical conditioning of sludge, in particular sludge coming from purification stations for treating dirty or waste or urban or industrial water: the incorporation thereof into the sludge, which can be subjected beforehand to an anaerobic digestion treatment, makes it possible to structure same in such a way that the water contained in the sludge is best exudated in the dehydration operation which follows. The effectiveness of the mechanical dehydration operation such as filtering or centrifuging can thus be improved, the volumes produced after that dehydration procedure being reduced by virtue of obtaining a filter cake with a high level of dryness.

The amount of composition used for conditioning a sludge is such that it generally corresponds to between 0.05 and 3 times and preferably between 0.1 and 2 times the amount of theoretical cationic charge necessary to neutralise the amount of cationic charge of the sludge to be treated; in other words, the amount of composition claimed is such that as an absolute value it has a cationicity generally equal to between 0.05 and 3 times and preferably between 0.1 and 2 times the anionicity of the sludge to be treated.

In general the compositions claimed are diluted before use. That dilution is more particularly necessary for the composition which occurs in the form of an invert emulsion obtained by mixing the invert emulsion of the mineral cation and that of the polyelectrolyte for transforming it into a direct emulsion. That phase inversion can also be implemented by adding a suitable surface active agent. In the case where the compositions are in the form of double emulsions the dilution operation on the other hand is optional.

The following Examples and Figures are set forth by way of non-limiting illustration of the invention.

ABBREVIATIONS

PAM—cationic polyacrylamide
PAC—polyaluminum chloride

Material

Invert emulsion of copolymer acrylamide/diallyldialkylammonium chloride of a molecular weight of about $3.10^6$, as 50% by weight, referred to hereinafter as 'PAM emulsion'.

Copolymer acrylamide/diallyldimethylammonium chloride of molecular weight of about $3.10^6$ in powder form.

Aquarhone 18® (solution of polyaluminum chloride marketed by Rhodia containing 4.56 moles of aluminum per kg–E.S=38.2%).

Vaseline (Prolabo)

Alkamuls S80®: sorbitan oleate of HLB 4.3 (Rhodia).

Alkamuls S20®: sorbitan monolaurate of HLB 8.6 (Rhodia)

Span 85®: sorbitan trioleate of HLB 1.7 (Sigma-Aldrich)

Alkamuls T20®: sorbitan monolaurate of 200E HLB 16.6 (Rhodia)

Alkamuls T85®: sorbitan trioleate 200E HLB 11 (Rhodia)

Ethoxylated phosphate esters PA35 (Rhodia).

EXAMPLE 1

Producing an invert emulsion of PAM.

Diallyidimethylammonium chloride of a molecular weight of about $3.10^6$.

Taking 50 g of cationic polyacrylamide copolymer in the form of a powder, an invert emulsion is produced in a water/vaseline 1 g/47.4 g mixture using 1.6 g of a mixture of sorbitan monolaurate/sorbitan oleate S20/S80 88%/12% (that is to say the required HLB of 8 for vaseline).

EXAMPLE 2

Producing an invert emulsion of PAC.

a) A solution, Aquarhone 18®, is diluted with water (20 g of water for 50 g of Aqua 18).

b) 5% of surface active agent S80® is added to the vaseline oil (that is to say 2 g of S80 for 38 g of vaseline).

After passing b) for a period of 30 s in an utraturax at 8000 rpm, a) is progressively poured into b) for a period of about 5 minutes, still at the same speed. Addition is effected for one minute at a speed of 9500 rpm.

After storage for one week at 45° C., those emulsions whose size is less than 5 $\mu$m experience slight sedimentation (appearance of a small amount of supernatant oil). The whole thing however is fairly easily returned to solution by simple manual agitation.

EXAMPLE 3

Production of an invert PAC-PAM emulsion.

Using an ultraturax, 92.35 g of the PAC emulsion prepared in accordance with Example 2 and 7.6 g of the PAM emulsion prepared in accordance with Example 1 are mixed.

That then gives a fluid invert emulsion comprising by weight: 16.1% of PAC, 3.8% of PAM, 42.8% of water, 35.7% of oil and at least 1.6% of surface active agent.

The different tests carried out show that mixing using the ultraturax of the two invert emulsions obtained in accordance with the preceding Examples makes it possible to obtain an invert PAC-PAM emulsion whose behaviour in respect of stability is similar to the invert emulsions of PAC alone.

Inversion of a PAC-PAM emulsion preserved for 13 days and then re-homogenised is achieved after the addition of a surface active agent such as sorbitan monolaurate 200E Alkamuls (T20®) in water. As soon as that emulsion is direct again, the viscosity of the system increases greatly and demonstrates the formation of the gel polyacrylamide $Al^{3+}$. That observation indicates limited diffusion of PAM or PAC between the drops of water during the storage period.

The two compounds are thus effectively separated within the invert emulsion, thus preserving for same a satisfactory level of fluidity.

EXAMPLE 4

Preparation of a double emulsion based on PAC and PAM.

This emulsion is prepared by mixing an aqueous solution of polyaluminium chloride (commercial solution Aquarhone 18®) and an invert PAM emulsion.

The invert PAM emulsion is prepared in accordance with the procedure described hereinbefore in Example 1. It is then added with agitation to Aquarhone 18®. Two mixtures A and B are thus obtained with different PAC/PAM ratios.

for a mixture referred to as A: a commercial emulsion of PAM with 4% and a solution of Aquarhone 18® are mixed, in such a way as to produce a mixture with 18.2% of commercial Aquarhone 18® and 3.27% of PAM emulsion, being a weight ratio of PAC/PAM active materials of 3.9;

for a mixture referred to as B: a commercial emulsion of PAM with 2% and a solution of Aquarhone 18® are mixed, in such a way as to produce a mixture with 20% of commercial Aquarhone 18® and 1.6% of PAM emulsion, being a weight ratio of PAC/PAM active materials of 8.75.

The effectiveness of the mixtures A and B is evaluated in drainability and piston filter tests and compared to that obtained with sludges into which Aquarhone 18® and the PAM emulsion have been incorporated separately and sequentially, in amounts identical to those involved in the respective mixtures.

EXAMPLE 5

Drainability test.

This involves a test which makes it possible to identify the composition which is more particularly suitable for dehydration of the sludges on a belt filter and/or a centrifuge.

This test is carried out on 200 g of biological sludge from an urban purification station having a proportion of dry matter of 6.35% of which 37.2% is mineral materials.

a) With the Mixture A and its Reference (Separate and Sequential Addition of the Two Constituents)

In the tests A is diluted to ⅙th, which provides that the amount of Aquarhone 18® goes from 18.2 to 3.03% and the amount of PAM emulsion goes from 3.27 to 0.545%.

Consequently, the respective amounts of the comparison constituents, that is to say which are added separately, are appreciated as follows:

corresponding to 10 g of A at ⅙th (that is to say 1.67 g of pure A) there are 0.303 g of commercial Aquarhone 18® and 9.7 g of PAM emulsion.

In the case of the drainability test with emission A, the latter is added to 200 g of sludge with mechanical agitation with a lacerating blade at 700 rpm in a beaker, the mixture is then poured into a filter and the amount of water which has percolated in dependence on time is evaluated.

In the case of the comparison drainability test, the procedure involves the sequential addition of the two products in accordance with the following mode of operation:

200 g of sludge is agitated at 700 rpm. Aquarhone E 18® is added thereto and agitation is continued for 10 seconds. The pre-conditioned sludge is then poured into a beaker in which the PAM emulsion has been weighed beforehand. The whole is poured twice from one beaker to another and then agitated for 15 seconds at 700 rpm. It is then deposited on a filter and the amount of water percolated is measured.

Figure 1:
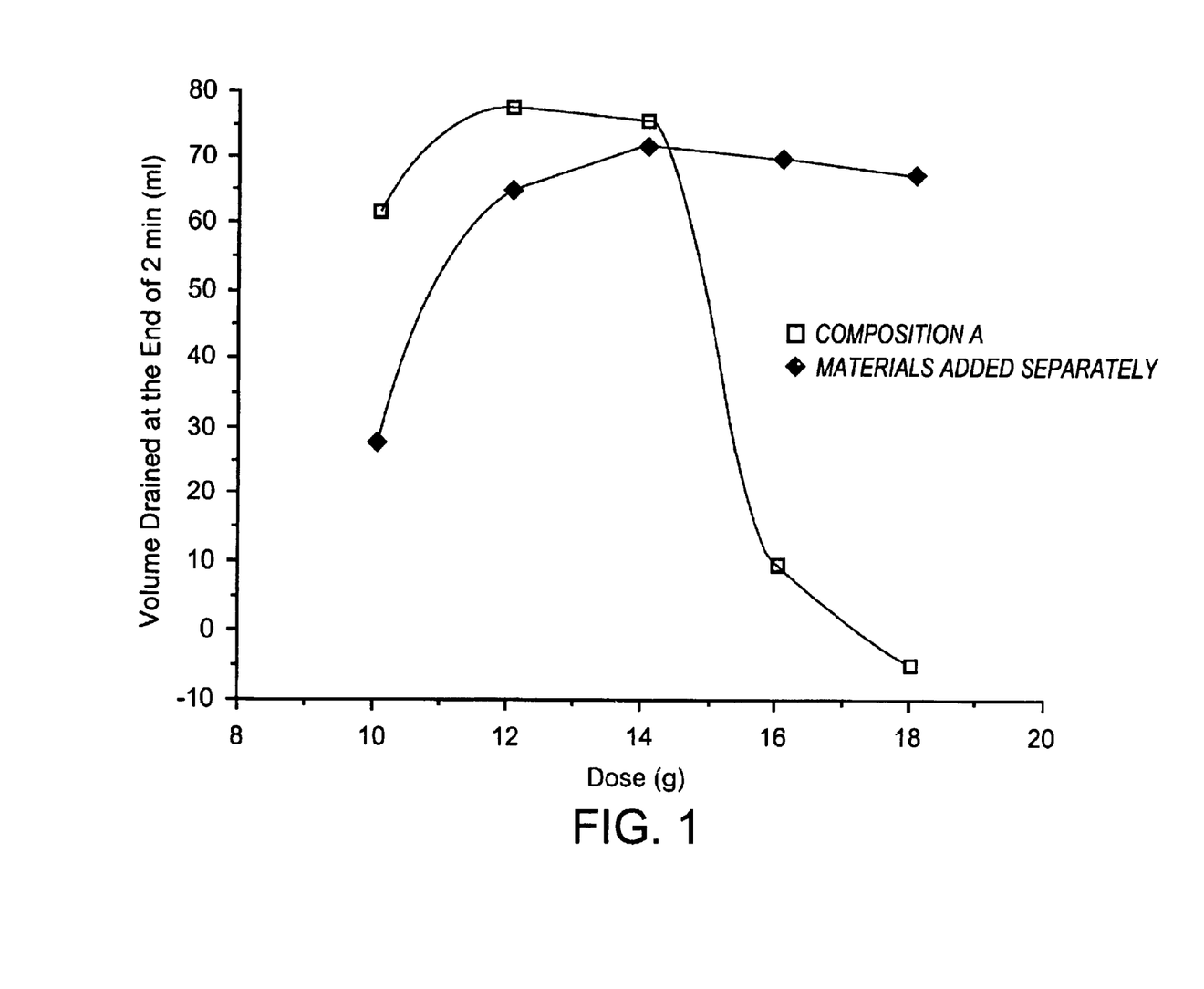
FIG. 1: representation for composition A and for its constituents when added separately, of the evolution in the volume drained at the end of 2 minutes in dependence on the conditioning dose.

The results obtained with A and the comparison are presented in the form of graphs in FIG. 1.

b) Mixture B and Comparison Mixture

In the tests B is diluted to ⅓rd, which means that the amount of Aquarhone 18® goes from 20.0% to 6.67% and the amount of PAM emulsion goes from 1.6% to 0.53%.

Thus 10 g of B at ⅙th (that is to say 3.33 g of pure B) corresponds to 0.667 g of commercial Aquarhone 18® and 9.33 g of PAM emulsion to 0.57%.

The addition of emulsion B and the addition of its two constituents separately in the comparison test is carried out in accordance with the procedures described for the preceding test.

Figure 2:
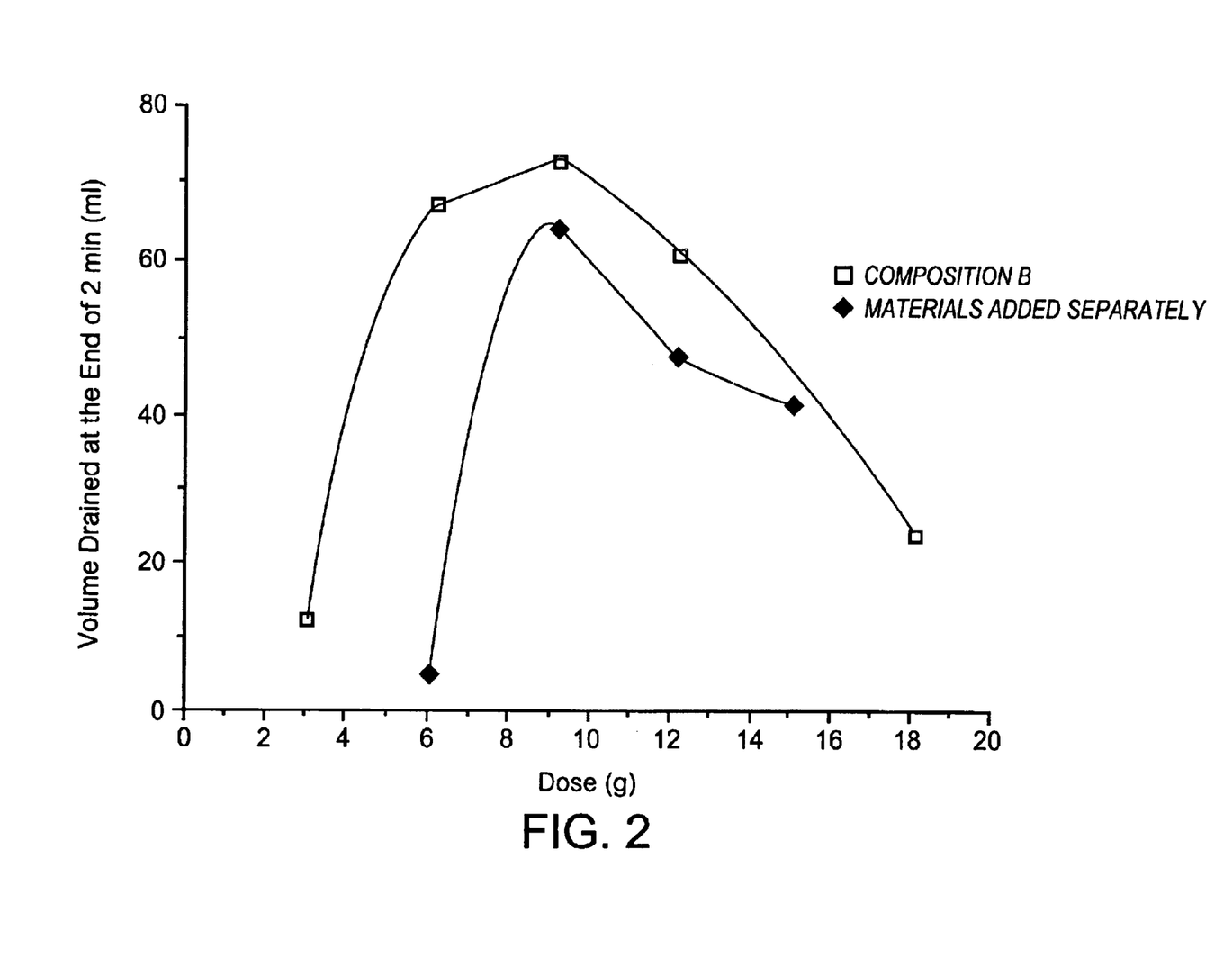
FIG. 2: representation for composition B and for its constituents when added separately, of the evolution in the volume drained at the end of 2 minutes in dependence on the conditioning dose.

The results obtained with B and its comparison are set out in the form of graphs in FIG. 2.

The array of the graphs in FIGS. 1 and 2 gives, for the mixtures A and B and for their constituents when added separately, the volume drained at the end of 2 minutes in dependence on the conditioning dose. It will be noted that the conditioning operations effected by the addition of Aquarhone 18® and then the PAM emulsion give smaller drained volumes than in the case of the conditioning operations which are implemented on the basis of the mixtures A and B. In consequence, use of the mixtures permits an economy in terms of product of between 20 and 40% with respect to the constituents when added separately, while maintaining optimum effectiveness.

Moreover the mixtures A and B are found to be markedly less viscous than the 0.56% PAM solution.

EXAMPLE 6

Evaluation on a piston filter.

This involves a test which makes it possible to identify the compositions which are more particularly suitable for dehydration of the sludge on a filter press.

This test is carried out with the following filtration conditions:

100 g of conditioned sludge is filtered on a piston filter at $2.10^5$ Pascals for a period of 10 minutes in order to plot the time/volume graph (T/V) in dependence on the volume which makes it possible to demonstrate the behaviour upon filtration. A filtration operation is then effected at $1.10^6$ Pascals for a period of 5 minutes in order to estimate the influence of the different conditioning procedures on the limit dryness obtained.

The conditioning dose is determined by measuring the capillary suction time (CST) at different doses.

Two doses for the conditioning operations are adopted: the dose at the minimum CST time and the dose with a slight overdosing.

a) Mixture A and its Comparison

Results with A diluted to ⅙th.

The conditioning doses are determined by measuring the CST. The data obtained are set forth in Table I hereinafter.

TABLE I

| CST on 50 g of sludge | dose A 4% ⅙th (g) | CST (sec) |
| --- | --- | --- |
| | 2.5 | >600 |
| | 3.00 | 24.60 |
| | 3.50 | 17.50 |
| | 4.00 | 31.00 |

The doses adopted are as follows:
3 g of A at ⅙th for 50 g of sludge, and
3.5 g of A at ⅙th for 50 g of sludge.

The filtration test is then carried out on a piston filter in accordance with the procedure described hereinbefore. The results obtained are presented in graph form in FIG. 3.

Figure 3:
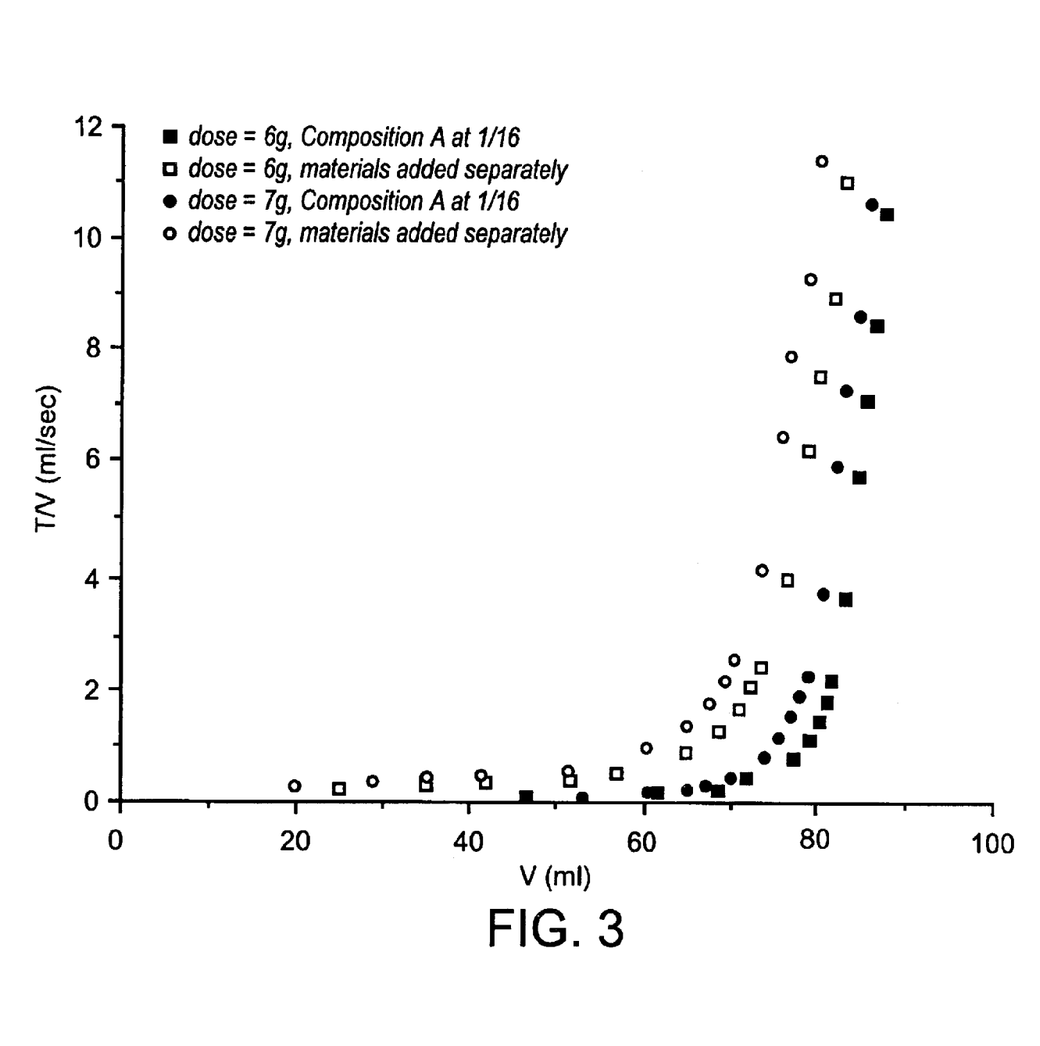
FIG. 3: representation of the graph showing t/v in dependence on v for the composition A and its constituents when added separately.

FIG. 3 also shows in graph form the results obtained for a sludge treated successively with the two constituents of A when added separately.

The doses of those constituents are calculated in the same manner as for the drainability test set out in Example 5.

b) Mixture B and its Comparison

In the same manner as for mixture B, the doses in respect of A are determined by measurements of CST at different doses. They are set out in Table II below.

TABLE II

| CST on 50 g of sludge | dose B 2% ⅓rd | CST (sec) |
| --- | --- | --- |
| | 1.50 | 272.0 |
| | 2.00 | 19.10 |
| | 2.50 | 20.50 |
| | 3.00 | 18.50 |
| | 4.00 | 44.10 |

The doses adopted are 2 g of B at ⅓rd for 50 g of sludge and 3 g of B at ⅓rd for 50 g of sludge.

Filtration tests are then carried out on the piston filter using the procedure as described hereinbefore.

Figure 4:
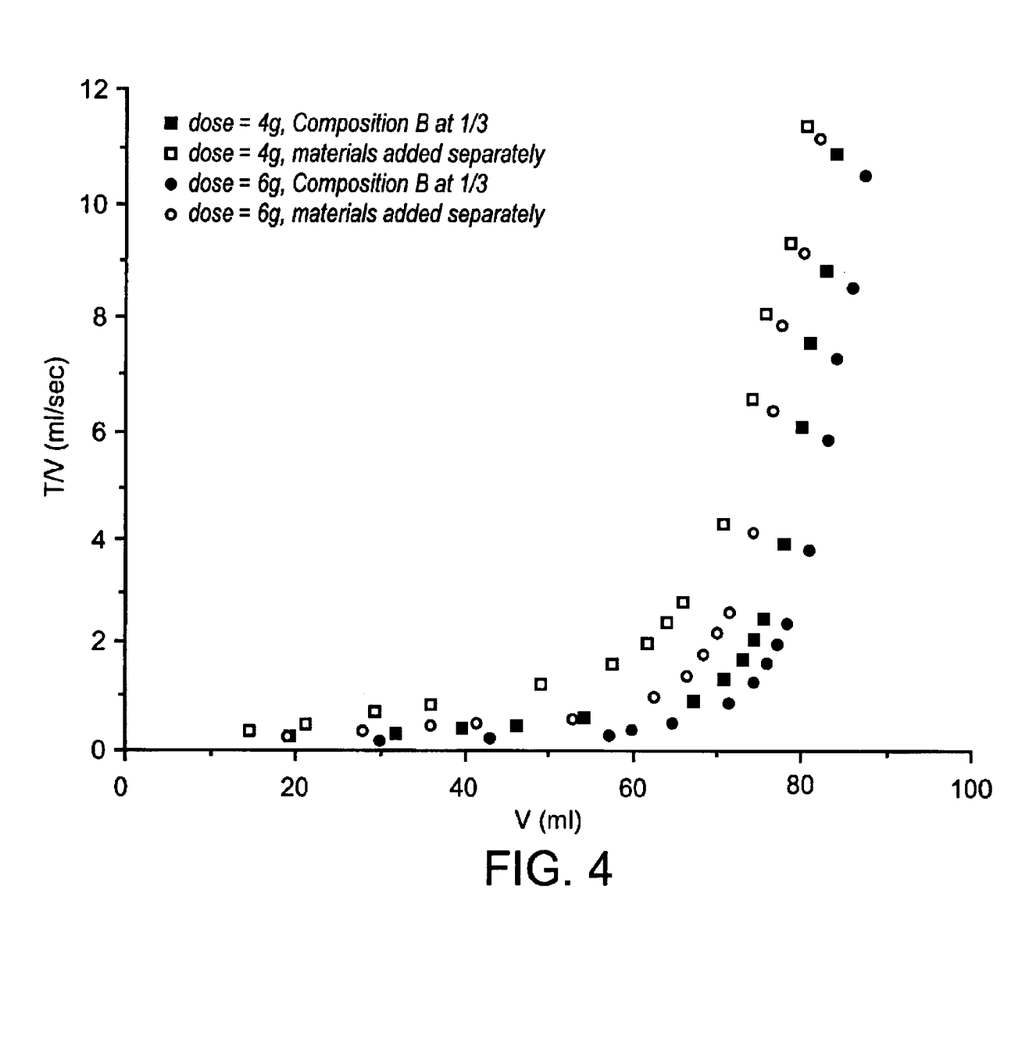
FIG. 4: representation of the graph showing t/v in dependence on v for the composition B and its constituents when added separately.
Figure 5:
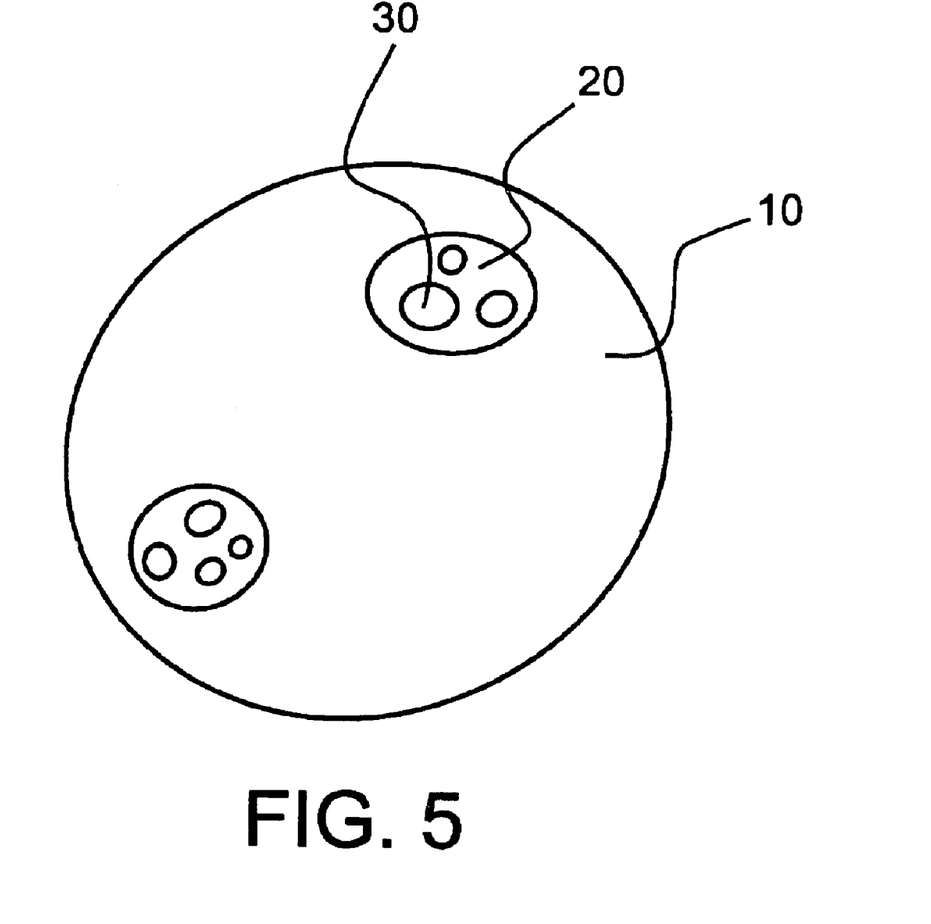
FIG. 5 illustrates an exemplary double water/oil/water emulsion. The double water/oil/water emulsion can contain a continuous aqueous phase 10, an oily phase 20 and a second aqueous phase 30.

The results obtained with emulsion A and its comparison mixture and likewise emulsion B and its comparison mixture are respectively set forth in FIGS. 3 and 4. Those Figures show the graphs in respect of t/v in dependence on v for the two mixtures and their constituents when added separately. It appears that it is in terms of dryness or in terms of behaviour upon filtration that the fact of adding the products constituting the mixtures separately reduces the effectiveness of the conditioning procedure. The specific resistances are in fact higher and the levels of dryness lower.

What is claimed is:

1. A composition useful for conditioning sludge obtained by mixing at least one invert emulsion containing at least one cationic polyelectrolyte with an aqueous solution containing at least one mineral cation with a charge of greater than or equal to 2.

2. A composition as set forth in claim 1 wherein it is in the form of an invert water-in-oil emulsion in which said mineral cation and said cationic polyelectrolyte are distributed in separate water droplets in the oily phase.

3. A composition as set forth in claim 1 wherein it is in the form of a double water/oil/water emulsion which comprises a continuous aqueous phase in which an oily phase is dispersed, and a second aqueous phase dispersed in the oily phase, wherein the mineral cation is present in the continuous aqueous phase and the cationic polyelectrolyte is distributed at least in part in water droplets constituting the second aqueous phase.

4. A composition as set forth in claim 1 wherein the mineral cation is selected from $Mg^{2+}$, $La^{3+}$, $Fe^{3+}$, $Al^{3+}$, $Zr^{4+}$ and their polymerised forms when they exist.

5. A composition as set forth in claim 4 wherein said mineral cation is $Al^{3+}$ or one of its polymerised forms.

6. A composition as set forth in claim 1 wherein the mineral cation is in the form of a water-soluble salt.

7. A composition as set forth in claim 6 wherein the water-soluble salt is selected from the group consisting of a chloride, nitride, sulfate and acetate.

8. A composition as set forth in claim 1 wherein the mineral cation is an aluminum chloride or one of its polymerised forms.

9. A composition as set forth in claim 1 wherein the mineral cation is used in a proportion of between 0.05 and 2 moles per kg of said composition.

10. A composition as set forth in claim 9 wherein the mineral cation is used in a proportion of between 0.49 and 1.8 moles per kg of said composition.

11. A composition as set forth in claim 1 wherein the cationic polyelectrolyte is of a molecular weight of higher than $1 \cdot 10^6$.

12. A composition as set forth in claim 1 wherein the cationic polyelectrolyte is selected from polyacrylamides, oxides of polyethylenes, polyvinylpyrrolidones, and cationic polymers of natural origin.

13. A composition as set forth in claim 1 wherein said cationic polyelectrolyte is a polyacrylamide having between 0.1% and 15% of cationic charge.

14. A composition as set forth in claim 1 wherein the cationic polyelectrolyte is selected from copolymers of polyacrylamide with cationic monomers or polyacrylamides modified in accordance with the Mannich reaction.

15. A composition as set forth in claim 1 wherein the polyelectrolyte is a cationic polyacrylamide copolymer selected from copolymers acrylamides/halide, of diallyldialkylammonium, copolymers diaminoalkylmethacrylate/acrylamides and copolymers dialkylaminoalkylmethacrylates/acrylamides.

16. A composition as set forth in claim 15 wherein the polyelectrolyte is selected from the copolymers acrylamides/chloride of diallyldialkylammonium.

17. A composition as set forth in claim 1 wherein the cationic polyelectrolyte is used in a proportion of at most 10% by weight of said composition.

18. A composition as set forth in claim 17 wherein the cationic polyelectrolyte is used in a proportion of between 0.3% and 8% by weight of said composition.

19. A composition as set forth in claim 1 wherein the mineral cation is a polyaluminum chloride and the cationic polyelectrolyte is a copolymer acrylamide/diallyldimethylammonium chloride of a molecular weight on the order of $3 \cdot 10^6$.

20. A composition as set forth in claim 1 wherein the mineral cation and the polyelectrolyte are used in such a way that the mineral cation/cationic polyelectrolyte molar ratio is between $1 \cdot 10^2$ and $8 \cdot 10^6$.

21. A composition as set forth in claim 20 wherein the mineral cation and the polyelectrolyte are used in such a way that the mineral cation/cationic polyelectrolyte molar ratio is between $1 \cdot 10^3$ and $8 \cdot 10^6$.

22. A composition as set forth in claim 20 wherein when the mineral cation is polyaluminum chloride and the polyelectrolyte is a copolymer acrylamide/diallyldimethylammonium chloride, the mineral cation/cationic polyelectrolyte weight ratio is between 0.1 and 15.

23. A composition as set forth in claim 22 wherein when the mineral cation is polyaluminum chloride and the polyelectrolyte is a copolymer acrylamide/diallyldimethylammonium chloride, the mineral cation/cationic polyelectrolyte weight ratio is between 0.1 and 10.

24. Method of using the composition as set forth in claim 1 for the treatment of an aqueous medium, comprising contacting the composition with the aqueous medium.

25. A method as set forth in claim 24 wherein the aqueous medium comprises waste, urban or industrial water.

26. Method of using the composition as set forth in claim 1, for the treatment of a biological sludge, comprising contacting the composition with the biological sludge.

27. A method as set forth in claim 26, wherein the biological sludge is obtained from purification of dirty or waste water, and the treated biological sludge is subsequently dehydrated.

28. A composition useful for conditioning sludge wherein it is in the form of an emulsion comprising in aqueous phase or phases and separately at least one mineral cation of a charge of greater than or equal to 2 and a cationic polyelectrolyte.

29. A composition useful for conditioning sludge obtained by mixing at least one invert emulsion containing at least one cationic polyelectrolyte with an invert emulsion containing at least one mineral cation with a charge of greater than or equal to 2, wherein said composition is in the form of an invert water-in-oil emulsion in which said mineral cation and said cationic polyelectrolyte are distributed in separate water droplets in the oily phase.

* * * * *